Patented Feb. 10, 1948

2,435,869

UNITED STATES PATENT OFFICE 2,435,869

CYANOETHYLATED FORMALS AND METHOD FOR THEIR PREPARATION

Herman A. Bruson and Thomas W. Riener, Philadelphia, Pa., assignors to The Resinous Products & Chemical Company, Philadelphia, Pa., a corporation of Delaware No Drawing. Application April 19, 1944, Serial No. 531,762

13 Claims. (Cl. 260—464)

This invention relates to formals having the formula:

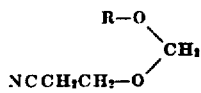

wherein R is a hydrocarbon or substituted hydrocarbon radical and to a unique method for their preparation.

As is already known in the prior art, formals can be prepared by condensing formaldehyde with alcohols. Since water is formed in the reaction, it is necessary to use dehydrating agents such as calcium chloride or zinc chloride to force the equilibrium in favor of formal formation. Other acidic condensing agents are used for the same purpose; namely, phosphoric, sulfuric, or hydrochloric acids, and the water is removed by distillation or by other means.

Now we have found that in an alkaline medium alcohols will react with formaldehyde and acrylonitrile to form formals without the splitting out of water. The reaction is one involving direct addition of the three components to each other under the influence of alkali, according to the equation

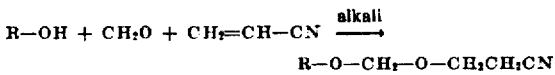

Due to the fact that water is not eliminated in the reaction, and that removal of the water is not necessary, the process of the present invention can be carried out not only in the presence of water but can even be applied to sensitive tertiary alcohols which are ordinarily dehydrated by acidic condensing agents and are, therefore, not amenable to the usual methods for making formals. Primary, secondary, and tertiary alcohols can therefore be used. These may be saturated or unsaturated, monohydric or polyhydric in character and may belong to the aliphatic, arylaliphatic, cycloaliphatic, or heterocyclic series. They may contain groups or radicals which are not affected by dilute alkali or by acrylonitrile, such as tertiary amino, cyano, thiocyano, halogen, or tertiary nitro groups, and their chains or cycles may be interrupted one or more times by ether-like oxygen or thioether linkages. Furthermore, the reaction is applicable to polymeric alcohols such as polysaccharides, polyvinyl alcohol, cellulose, starch, and the like.

Typical alcohols which can be used are, for example, primary, secondary, and tertiary alcohols of the aliphatic series such as methyl, ethyl, propyl, isopropyl, butyl, isobutyl, tertiary butyl, amyl, hexyl, octyl, dodecyl, hexadecyl, or octadecyl alcohols and unsaturated alcohols such as allyl, citronellyl, crotonyl, methallyl, and the like. Other alcohols of the arylaliphatic or cycloaliphatic series, such as benzyl, phenylethyl, phenoxyethoxyethyl, cyclohexyl, or terpene alcohols, such as borneol, isoborneol, fenchol, and the like, or heterocyclic alcohols, such a tetrahydrofurfuryl, may also be used.

The alkaline catalyst may be the oxide, hydroxide, amide, hydride, or alcoholate of an alkali metal or a quaternary ammonium hydroxide. Of these the alkali hydroxides, such as potassium hydroxide, or the strongly alkaline quaternary ammonium hydroxides, such as trimethyl benzylammonium hydroxide, are preferred.

The formaldehyde may be used as an aqueous solution or as a compound capable of liberating formaldehyde under the conditions of the reaction, such as paraformaldehyde.

While the reaction of the three components may be performed directly, the alcohol itself serving, as it were, as a convenient solvent, additional alcohol may be used as a solvent or another solvent, such as a hydrocarbon or a chlorinated solvent or water may be used. The reaction takes place readily at temperatures from room temperature up to the boiling point of common solvents such as benzene, water, or toluene. The preferred range of temperature is 30° to 50° C. In some cases the reaction is sufficiently exothermic to utilize desirably external cooling. After the reaction has been essentially completed, the reaction mixture is treated to remove or destroy the catalyst, as by washing or neutralization, and the product suitably purified, as by distillation, treatment with charcoal, extraction, or comparable treatment.

The following examples illustrate the invention:

Example 1

53 g. of acrylonitrile was added dropwise to a rapidly stirred suspension consisting of 100 g. of tertiary butyl alcohol, 30 g. of paraformaldehyde and 5 g. of 30% methanolic potassium hydroxide solution. The starting temperature was 25° C. The time of addition of the acrylonitrile was 25 minutes. During this addition the temperature spontaneously rose to 45° C. and the paraformaldehyde went almost completely into solution. The mixture was stirred and heated for ninety minutes at 35°–40° C. It was then filtered by suction to remove a small amount of undissolved paraformaldehyde, and the clear filtrate was washed with water several times until it was no longer alkaline to litmus. The washed oil was then distilled in vacuo.

The desired product distilled over at 75°-80° C./1-3 mm. as a colorless liquid. The yield was 63 g. Upon redistillation, the pure compound having the formula:

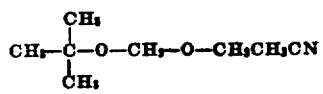

boiled at 100°-102° C./10 mm. It possessed the following constants:

$N_D^{25}$ 1.4205; $d_4^{25}$ 0.9486

Example 2

A mixture consisting of 30 g. of paraformaldehyde, 130 g. of octanol-2 (capryl alcohol), and 5 g. of aqueous 40% trimethyl benzylammonium hydroxide solution was stirred and heated at 43°-45° C. for about fifteen minutes until a clear solution was obtained. The solution was then cooled to 30° C. and 53 g. of acrylonitrile was added dropwise thereto with constant stirring during the course of twenty minutes. The exothermal reaction gradually carried the temperature to 45° C. at which point cooling was applied. After the exothermal reaction had ceased, the mixture was stirred and heated at 40°-43° C. for one hour, then washed with water and dilute boric acid solution and finally with water until free from alkalinity or acidity. The washed oil was distilled in vacuo.

The 2-octyloxymethyleneoxypropionitrile

distilled over at 150°-160° C./10 mm. in a yield of 100 grams. Upon redistillation, the pure compound boiled at 160° C./10 mm.

Example 3

To a stirred solution of 64 g. of methanol, 162 g. of 37% aqueous formaldehyde, and 5 g. of 30% potassium hydroxide solution there was gradually added 106 g. of acrylonitrile while the reaction mixture was maintained at 25°-35° C. Stirring was continued for four hours thereafter at room temperature and finally the mixture was warmed at 45° C. for three hours to complete the reaction.

The mixture was then extracted by shaking with several portions of ethylene dichloride. The ethylene dichloride extract on evaporation yielded 166 g. of residual oil which upon distillation in vacuo yielded 92 g. of the desired product; namely, methyloxymethyleneoxypropionitrile $$CH_3-O-CH_2-O-CH_2CH_2CN$$

boiling at 65°-85° C./5 mm.

Upon redistillation, the pure compound boiled at 103°-106° C./26 mm. or 200° C. at 775 mm. It is a colorless, water-soluble liquid.

Example 4

A stirred suspension of 58 g. of allyl alcohol, 30 g. of paraformaldehyde, and 5 g. of aqueous 40% trimethyl benzylammonium hydroxide solution was warmed at 40° C. for several minutes until a clear solution was obtained. To the stirred solution 53 g. of acrylonitrile was added dropwise during the course of fifteen minutes and the mixture stirred for three hours during which time the temperature was held between 25° and 50° C. The reaction mixture was shaken with an equal volume of ethylene dichloride and washed several times with cold water. The product was then distilled under reduced pressure and the fraction boiling between 65° and 100° C. at 2 mm. was refractionated. The desired product having the formula $$CH_2=CH-CH_2-O-CH_2-O-CH_2CH_2CN$$

distilled over at 100°-110° C./11-12 mm. as a colorless oil in a yield of about 45 grams.

Example 5

A mixture of 108 g. of benzyl alcohol, 30 g. of paraformaldehyde, and 4 g. of 40% trimethyl benzylammonium hydroxide solution was stirred at 35°-40° C. for fifteen minutes until a clear solution was obtained. The solution was cooled to 15° C. and 53 g. of acrylonitrile added. The mixture was stirred thereafter for six hours at room temperature during which time a gradual exothermal reaction occurred which was controlled by occasional cooling. The product was washed with water, then with boric acid solution, and finally several times with water. The washed oil was dried and distilled in vacuu.

The cut boiling at 140°-169° C./1 mm., amounting to 131 g., was redistilled and the fraction boiling at 133°-135° C./0.5 mm. collected as the pure product in a yield of 76 g. Its analysis agreed with the formula $$C_6H_5-CH_2-O-CH_2-O-CH_2CH_2CN$$

and it possessed the following constants:

$N_D^{25}$ 1.5023; $d_4^{25}$ 1.0705

In place of the monohydric alcohols used in the above examples, there may be used polyhydric alcohols. In the latter case there may be formed both monoformals and polyformals of the same general type as shown above. Typical polyhydric alcohols include ethylene glycol, diethylene glycol, triethylene glycol, and other polyethylene glycols, propylene glycol, trimethylene glycol, glycerin, monoethers of glycerin such as the methyl or phenyl ethers, pentaerythritol, mannitol, sorbitol, etc. Formals from polymeric polyhydric alcohols form another class of ethers of considerable interest.

The formals of this invention are useful as solvents, plasticizers, and softeners for plastic compositions, such as polyvinyl chloride.

We claim:

1. A method for preparing formals which comprises reacting by bringing together in the liquid phase an alcohol, formaldehyde, and acrylonitrile in the presence of an alkaline catalyst.

2. A method for preparing formals having the formula

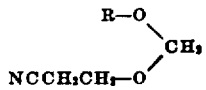

which comprises reacting in the liquid phase a monohydric, aliphatic alcohol, R—OH, with formaldehyde and acrylonitrile in the presence of an alkaline catalyst, R being an aliphatic hydrocarbon group.

3. A method for preparing the formal

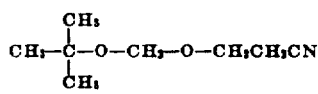

which comprises reacting by bringing together in the liquid phase tertiary butyl alcohol, formaldehyde, and acrylonitrile in the presence of an alkaline catalyst.

4. A method for preparing the formal $$CH_2=CH-CH_2-O-CH_2-O-CH_2CH_2CN$$

which comprises reacting by bringing together in the liquid phase allyl alcohol, formaldehyde, and acrylonitrile in the presence of an alkaline catalyst.

5. A method for preparing the formal $$CH_3CH_2CH_2CH_2CH_2CH_2-\underset{\underset{\displaystyle |}{CH_3}}{CH}-O-CH_2-O-CH_2CH_2CN$$

which comprises reacting by bringing together in the liquid phase capryl alcohol, formaldehyde, and acrylonitrile in the presence of an alkaline catalyst.

6. The method of claim 2 wherein the alkaline catalyst is a quaternary ammonium hydroxide.

7. As new compounds, formals having the formula

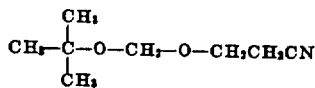

wherein R is an aliphatic hydrocarbon radical of one to eighteen carbon atoms.

8. As new compounds, formals having the formula

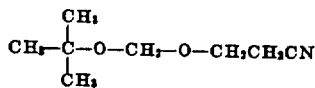

wherein R is a tertiary aliphatic hydrocarbon radical of not over eighteen carbon atoms.

9. Tertiary butoxymethyleneoxypropionitrile having the formula $$CH_3-\underset{\underset{\displaystyle |}{CH_3}}{\overset{\overset{\displaystyle CH_3}{|}}{C}}-O-CH_2-O-CH_2CH_2CN$$

10. Allyloxymethyleneoxypropionitrile having the formula $$CH_2=CH-CH_2-O-CH_2-O-CH_2CH_2CN$$

11. Capryloxymethyleneoxypropionitrile having the formula $$CH_3CH_2CH_2CH_2CH_2CH_2-\underset{\underset{\displaystyle |}{CH_3}}{CH}-O-CH_2-O-CH_2CH_2CN$$

12. A method for preparing formals having the formula

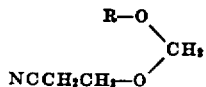

wherein R is the hydrocarbon residue of an alcohol, ROH, which comprises reacting at a temperature of about 30° C. to about 50° C. in the liquid phase an alcohol, ROH, formaldehyde, and acrylonitrile in the presence of an alkaline condensing agent.

13. A method for preparing compounds of the formula

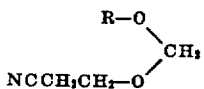

wherein R is a tertiary aliphatic hydrocarbon group, which comprises reacting at a temperature of about 30° C. to about 50° C. in the liquid phase a tertiary aliphatic alcohol, formaldehyde, and acrylonitrile in the presence of an alkaline catalyst.

HERMAN A. BRUSON.
THOMAS W. RIENER.

REFERENCES CITED

The following references are of record in the file of this patent:

UNITED STATES PATENTS

| Number | Name | Date |
|---|---|---|
| 2,280,792 | Bruson et al. | Apr. 28, 1942 |
| 2,352,671 | Walker | July 4, 1944 |
| 2,398,757 | Loder et al. | Apr. 16, 1946 |

FOREIGN PATENTS

| Number | Country | Date |
|---|---|---|
| 796,001 | France | Mar. 27, 1936 |
| 544,421 | Great Britain | Apr. 13, 1942 |
| 116,260 | Australia | Dec. 24, 1942 |
| 670,357 | Germany | Jan. 17, 1939 |

OTHER REFERENCES

Ostromysslenski, Beilstein (Handbuch der Org. Chemie), vol. 1, suppl. (1928), page 326.

Certificate of Correction

Patent No. 2,435,869.    February 10, 1948.

HERMAN A. BRUSON ET AL.

It is hereby certified that error appears in the printed specification of the above numbered patent requiring correction as follows: Column 5, line 12, claim 5, for the left-hand portion of the formula reading "CC₃CH₃" read $CH_3CH_3$; and that the said Letters Patent should be read with this correction therein that the same may conform to the record of the case in the Patent Office.

Signed and sealed this 13th day of April, A. D. 1948.

[SEAL]

THOMAS F. MURPHY,
*Assistant Commissioner of Patents.* hyde, and acrylonitrile in the presence of an alkaline catalyst.

4. A method for preparing the formal

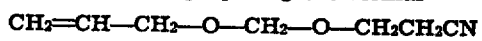

which comprises reacting by bringing together in the liquid phase allyl alcohol, formaldehyde, and acrylonitrile in the presence of an alkaline catalyst.

5. A method for preparing the formal

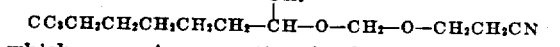

which comprises reacting by bringing together in the liquid phase capryl alcohol, formaldehyde, and acrylonitrile in the presence of an alkaline catalyst.

6. The method of claim 2 wherein the alkaline catalyst is a quaternary ammonium hydroxide.

7. As new compounds, formals having the formula

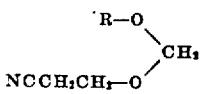

wherein R is an aliphatic hydrocarbon radical of one to eighteen carbon atoms.

8. As new compounds, formals having the formula

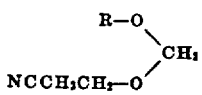

wherein R is a tertiary aliphatic hydrocarbon radical of not over eighteen carbon atoms.

9. Tertiary butoxymethyleneoxypropionitrile having the formula

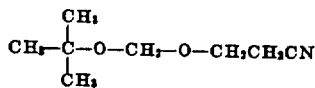

10. Allyloxymethyleneoxypropionitrile having the formula

CH₂=CH—CH₂—O—CH₂—O—CH₂CH₂CN

11. Capryloxymethyleneoxypropionitrile having the formula

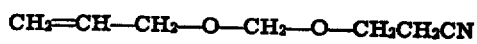
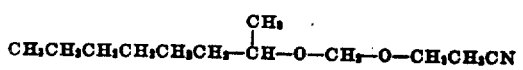

12. A method for preparing formals having the formula

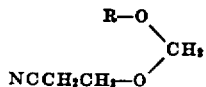

wherein R is the hydrocarbon residue of an alcohol, ROH, which comprises reacting at a temperature of about 30° C. to about 50° C. in the liquid phase an alcohol, ROH, formaldehyde, and acrylonitrile in the presence of an alkaline condensing agent.

13. A method for preparing compounds of the formula

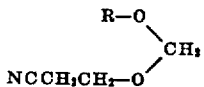

wherein R is a tertiary aliphatic hydrocarbon group, which comprises reacting at a temperature of about 30° C. to about 50° C. in the liquid phase a tertiary aliphatic alcohol, formaldehyde, and acrylonitrile in the presence of an alkaline catalyst.

HERMAN A. BRUSON.
THOMAS W. RIENER.

REFERENCES CITED

The following references are of record in the file of this patent:

UNITED STATES PATENTS

| Number | Name | Date |
| --- | --- | --- |
| 2,280,792 | Bruson et al. | Apr. 28, 1942 |
| 2,352,671 | Walker | July 4, 1944 |
| 2,398,757 | Loder et al. | Apr. 16, 1946 |

FOREIGN PATENTS

| Number | Country | Date |
| --- | --- | --- |
| 796,001 | France | Mar. 27, 1936 |
| 544,421 | Great Britain | Apr. 13, 1942 |
| 116,260 | Australia | Dec. 24, 1942 |
| 670,357 | Germany | Jan. 17, 1939 |

OTHER REFERENCES

Ostromysslenski, Beilstein (Handbuch der Org. Chemie), vol. 1, suppl. (1928), page 326.

---

Certificate of Correction

Patent No. 2,435,869.                                February 10, 1948.

HERMAN A. BRUSON ET AL.

It is hereby certified that error appears in the printed specification of the above numbered patent requiring correction as follows: Column 5, line 12, claim 5, for the left-hand portion of the formula reading "CC₃CH₃" read $CH_3CH_3$; and that the said Letters Patent should be read with this correction therein that the same may conform to the record of the case in the Patent Office.

Signed and sealed this 13th day of April, A. D. 1948.

[SEAL]

THOMAS F. MURPHY,
*Assistant Commissioner of Patents.*